Sept. 22, 1936.  J. D. FUREY  2,055,147

PERAMBULATOR, INVALID'S CHAIR, TRADESMAN'S CARRIER AND THE LIKE

Filed Sept. 23, 1935

J. D. Furey
INVENTOR

By: Glascock Downing Seebold
Attys.

Patented Sept. 22, 1936

2,055,147

UNITED STATES PATENT OFFICE 2,055,147

PERAMBULATOR, INVALID'S CHAIR, TRADESMAN'S CARRIER AND THE LIKE

James Dixon Furey, Cabra, Dublin, Ireland

Application September 23, 1935, Serial No. 41,810. In Great Britain and Irish Free State November 2, 1934

3 Claims. (Cl. 280—48)

This invention has reference to perambulators, invalids' chairs, tradesmen's carriers and the like, of the type wherein each front wheel is mounted on one arm of a bell crank lever fulcrumed to a suitable support, the other arms of the two levers being interconnected by a cross bar which, in turn, is operatively connected to the usual handle by the operation of which the bell cranks can be turned about their pivots and the perambulator, invalid's chair, tradesman's carrier or the like maneuvered or steered as may be desired.

The invention has for its object to provide improvements in the steering mechanism of perambulators, invalids' chairs, tradesmen's carriers and the like of the type set forth.

A preferred embodiment of the invention is shown, by way of example, as applied to a perambulator on the annexed sheet of drawings wherein:—

Figure 1:
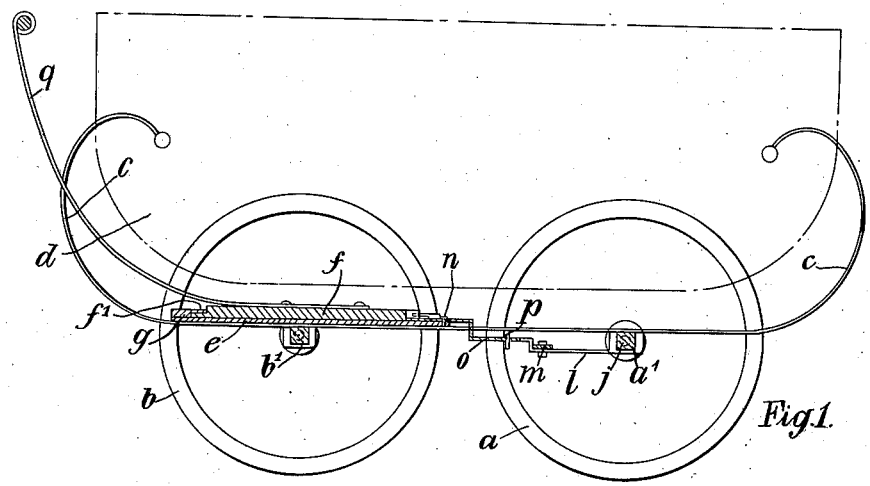
Figure 2:
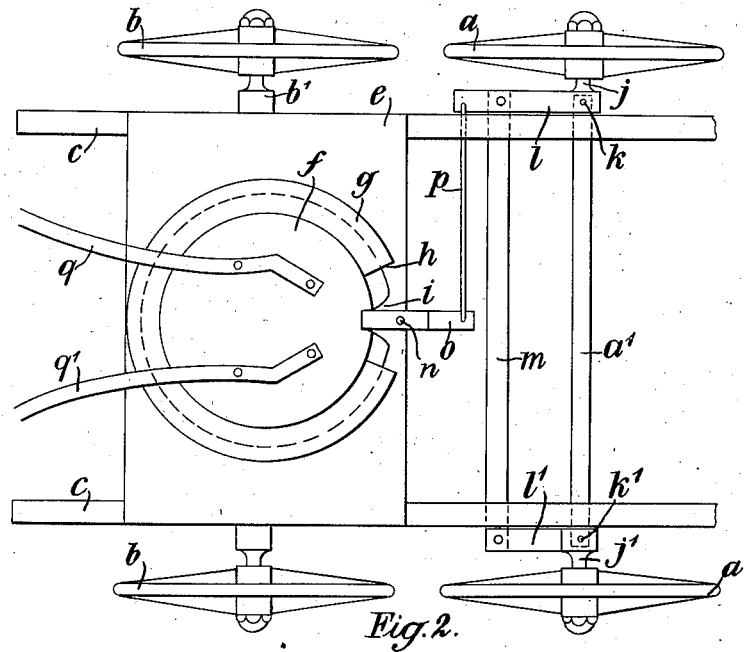

Figure 1 is a sectional elevation of a perambulator having the invention applied thereto, and Figure 2 is a plan view of the chassis thereof.

In the drawing $a$ designates the front wheels, $b$ the rear wheels, $c$ the usual springs supported by the axles $a^1$ and $b^1$ of the front and rear wheels respectively, and $d$ indicates the body of the perambulator which is suspended from the upturned ends of the springs.

Secured to the said springs is a transversely extending plate $e$ which in turn supports a turntable. The turntable comprises a disc-like member $f$ provided with an annular rebate $f^1$. A ring $g$, recessed to accommodate the annular projection of the member $f$, is secured to the plate $e$. Said ring is provided with a gap at $h$, and the disc-like member is provided with a recess $i$ in the periphery thereof.

The front axle is not solid throughout its length, but the two end portions on which the front wheels are mounted are formed by the arms $j$ and $j^1$ of bell crank levers fulcrumed to the ends of the solid portion of said axle at $k$, $k^1$, that is, the front wheels are carried by the swivel axles. The other arms $l$ and $l^1$ of said bell crank levers are pivotally connected to the connecting or track rod $m$. Pivoted at $n$ to the plate $e$ is a lever $o$, one end of which fits into the recess $i$ and the other end is connected by a link $p$ to an extension of the arm $l$.

The lower ends of the usual handles $q$, $q^1$ are riveted or otherwise secured to the disc-like member $f$.

It will be apparent that when the handles are moved to rotate the disc-like member $f$ the latter turns the lever $o$ about its pivot and thereby, through link $p$ and bell crank levers, turns the swivel axles. Consequently, there is no need to raise the front wheels to effect steering as the perambulator can be steered by moving the handles to turn the disc-like member in the appropriate direction and to the appropriate extent, a corresponding movement being transmitted to the front wheels.

Instead of the circular member $f$ rotating in the ring $g$ it may be made in the form of a frame rotating about a central pin and the lever $o$ may be operated by a lever secured to the frame or to the pin in which case the pin is also secured to the frame and the pin is free to rotate in the plate.

The outward appearance of the perambulator remains substantially unaffected.

It is to be understood that the invention can be applied to invalids' chairs, tradesmen's carriers, push carts and the like as well as to perambulators.

What I claim is:—

1. A perambulator, having a chassis, a rear axle, wheels mounted on said axle, a pair of bell crank levers, one fulcrumed at each side of and towards the front of the chassis, means interconnecting corresponding arms of each bell crank, a front wheel mounted on the other arm of each bell crank, a supporting plate secured to the chassis, a circular plate having a notch therein mounted on said plate, an annular member having a gap therein enclosing said circular plate, a two armed lever pivoted to the supporting plate and having one end located in the notch of the circular plate, a link operatively connecting the other arm of said lever to one of the bell cranks and at least one steering handle connected to said circular plate.

2. A perambulator, having a chassis, a rear axle, wheels mounted on said axle, a pair of bell crank levers, one fulcrumed at each side of and towards the front of the chassis, means interconnecting corresponding arms of each bell crank, a front wheel mounted on the other arm of each bell crank, a supporting plate secured to the chassis, a circular plate having an annular rebate, said plate having a notch in the periphery thereof, a ring secured to the supporting plate and registering with said rebate, said ring having a gap therein, a two armed lever pivoted to said supporting plate, one arm thereof registering with the notch in the circular plate, a link operatively connecting the other arm of said lever with one of the arms of one of the bell cranks, and at least one steering handle connected to said circular plate.

3. A perambulator having a chassis, a rear axle, wheels mounted on said axle, a pair of bell crank levers, one fulcrumed at each side of and towards the front of the chassis, means interconnecting corresponding arms of each bell crank, an extension carried by one of said arms, a front wheel mounted on the other arm of each bell crank, a circular member supported by the chassis, means holding said member to said chassis so as to permit of rotation in a horizontal plane, at least one steering handle operatively connected to said member, a pivoted two armed lever on the frame, one arm of which engages a notch in said member, and a link connecting the other arm of said lever with the said extension.

JAMES DIXON FUREY.